(12) United States Patent
Beasley

(10) Patent No.: US 8,218,393 B2
(45) Date of Patent: Jul. 10, 2012

(54) TECHNIQUE AND SYSTEM TO INCREASE THE LENGTH OF A SEISMIC SHOT RECORD

(75) Inventor: Craig J. Beasley, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 708 days.

(21) Appl. No.: 12/164,981

(22) Filed: Jun. 30, 2008

(65) Prior Publication Data
US 2009/0323469 A1   Dec. 31, 2009

(51) Int. Cl.
*G01V 1/38* (2006.01)
*G01V 1/28* (2006.01)
(52) U.S. Cl. ............................... 367/23; 367/21; 367/38
(58) Field of Classification Search .................... 367/21, 367/24, 38, 59, 23
See application file for complete search history.

(56) References Cited

U.S. PATENT DOCUMENTS

| | | | |
|---|---|---|---|
| 4,170,002 A | 10/1979 | Strange | |
| 4,405,999 A * | 9/1983 | Zachariadis | 367/23 |
| 5,719,821 A | 2/1998 | Sallas et al. | |
| 5,924,049 A | 7/1999 | Beasley et al. | |
| 6,151,556 A * | 11/2000 | Allen | 702/18 |
| 6,545,944 B2 | 4/2003 | de Kok | |
| 6,751,559 B2 * | 6/2004 | Fookes et al. | 702/17 |
| 6,876,599 B1 | 4/2005 | Combee | |
| 6,882,938 B2 | 4/2005 | Vaage et al. | |
| 6,906,981 B2 | 6/2005 | Vaage | |
| 7,196,969 B1 | 3/2007 | Karazineir | |
| 7,679,990 B2 * | 3/2010 | Herkenhoff et al. | 367/23 |
| 2005/0027454 A1 | 2/2005 | Vaage et al. | |

OTHER PUBLICATIONS

Beasley, et al., A New Look at Simultaneous Sources, SEG Expanded Abstracts, 1998.
Beasley, A New Look at Marine Simultaneous Sources, The Leading Edge, 2008, pp. 914-917, vol. 27.
Berkhout, Changing the Mindset in Seismic Data Acquisition, The Leading Edge , Jul. 2008, pp. 924-938, vol. 27.
Hampson, et al, Acquisition using Simultaneous Sources, SEG Technical Program Expanded Abstracts, 2008.
Hampson, et al., Acquisition using simultaneous sources, Society of Petroleum Engineers—69th European Association of Geoscientists and Engineers Conference and Exhibition 2007, pp. 2741-2745.
Lynn, et al., Experimental Investigation of Interference from other Seismic Crews, Geophysics, Nov. 1987, pp. 1501-1524, vol. 24.
Moore, et al., Stable, Efficient, High-resolution Radon Transforms, 64th EAGE Annual Conference and Exhibition, 2002.
Moore, et al, But Simultaneous Sources Separation using Dithered Sources, SEG Expanded Abstracts, 2008, pp. 2806-2810, vol. 27.
PCT Search Report, dated Feb. 12, 2010, Application No. PCT/US2009/048139.

* cited by examiner

*Primary Examiner* — Ian Lobo

(57) ABSTRACT

A system includes an interface and a processor. The interface receives seismic datasets, which are associated with multiple firings of a set of at least one seismic source. Each dataset is acquired by seismic sensors during a different time period of a sequence of time periods that are limited by times at which the set of seismic source(s) are fired. The processor, for each of the firings of the set of seismic source(s), generates an associated shot record based on information contained at least two of the datasets.

18 Claims, 4 Drawing Sheets

TECHNIQUE AND SYSTEM TO INCREASE THE LENGTH OF A SEISMIC SHOT RECORD

BACKGROUND

The invention generally relates to a technique and system to increase the length of a seismic shot record.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining first seismic data acquired by seismic sensors during a first time period after a first firing of a seismic source and obtaining second seismic data acquired by the seismic sensors during a subsequent time period after a second firing of the seismic source. The technique includes generating a shot record, which corresponds to the first firing of the seismic source based on the first and second seismic data.

In another embodiment of the invention, a system includes an interface and a processor. The interface receives seismic datasets, which are associated with multiple firings of a seismic source. Each dataset is acquired by seismic sensors during a different time period of a sequence of time periods that are delimited by times at which the seismic source is fired. The processor, for each firing of the seismic source, generates an associated shot record based on information contained in at least two of the datasets.

In another embodiment of the invention, an article includes a computer accessible storage medium to store instructions that when executed by a processor-based system cause the processor-based system to receive seismic datasets associated with multiple firings of a seismic source. Each dataset is acquired by seismic sensors during a different time period of a sequence of time periods that are delimited by times at which the seismic source is fired. The instructions when executed by the processor-based system cause the processor-based system to, for each of the firing of the seismic source, generate an associated shot record based on information contained in at least two of the datasets.

Advantages and other features of the invention will become apparent from the following drawing, description and claims.

DETAILED DESCRIPTION

Figure 1:
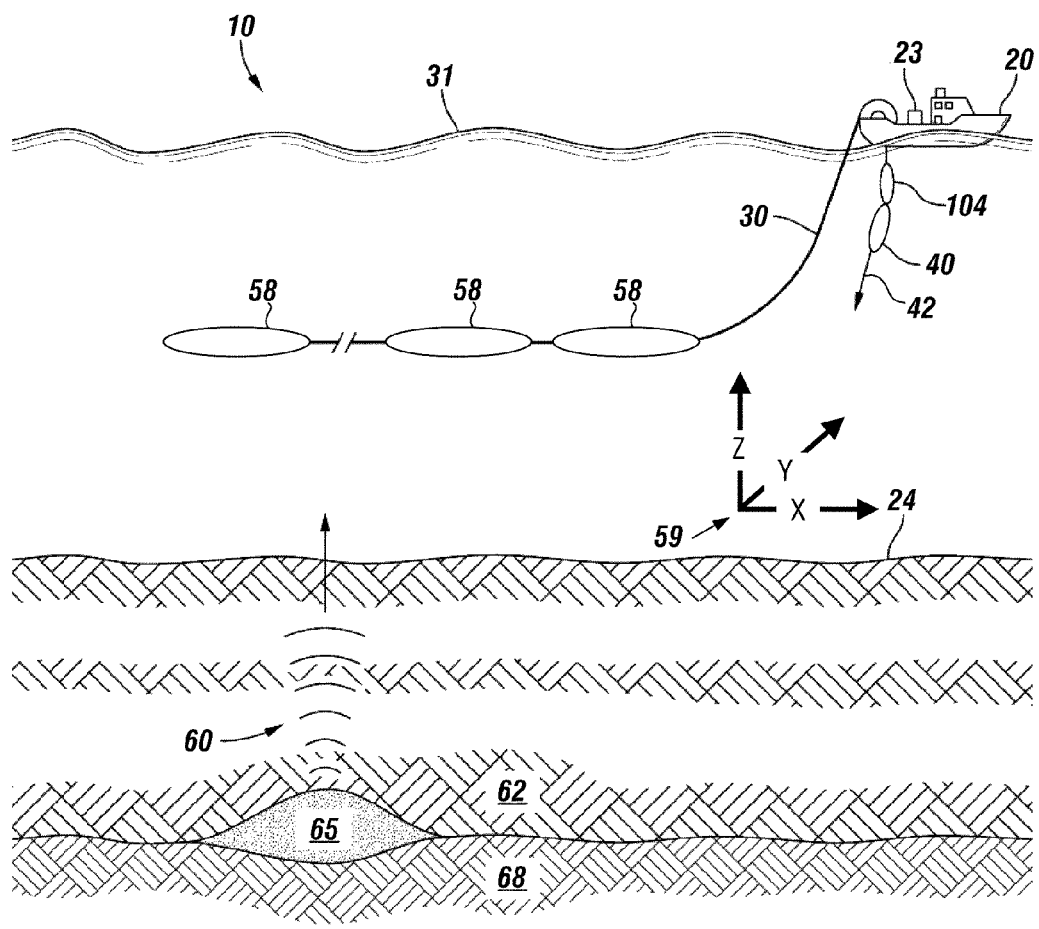
FIG. 1 is a schematic diagram of a marine seismic data acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which may be, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes one or more seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone 55; and the sensor 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 12 and is further described below) that may be, for example, located on land or on the vessel 20. Thus, many variations are possible and are within the scope of the appended claims.

A particular seismic source 40 may be formed from an array of seismic source elements (such as air guns, for example) that may be arranged in strings (gun strings, for example) of the array. Alternatively, a particular seismic source 40 may be formed from one or a predetermined number of air guns of an array, may be formed from multiple arrays, etc. Regardless of the particular composition of the seismic sources, the sources may be fired in a particular time sequence during the survey.

There are many physical constraints in acquired seismic data, such as the relationship of the record length to the acquisition efficiency. More specifically, the energy that is sensed by the seismic sensors due to a given firing, or "shot," of a seismic source typically is recorded from a time interval that spans from the time at which the shot occurred and ends slightly before the time at which the next shot occurs. For purposes of increasing the efficiency, techniques, such as the one disclosed in U.S. Pat. No. 5,924,049, entitled "METHODS FOR ACQUIRING AND PROCESSING SEISMIC DATA," which issued on Jul. 13, 1999, allow multiple seismic sources to fire simultaneously and essentially allow more than one record to be recorded at the same time. However, acquisition efficiency is still limited by the need to record full records before another shot occurs.

As a practical matter, the need to record a full record before another shot occurs may place limitations on the maximum record length, the shot interval, vessel speed and other aspects of the survey acquisition design and methodology. In accordance with embodiments of the invention, techniques and systems are described herein for purposes of effectively increasing the record length by extending the record length for a given shot to include time in which one or more additional shots occur.

More specifically, the techniques that are described herein rely on the observation that even a single seismic source interferes with itself In the typical recording time (ten seconds or more, for example) for a given shot record, significant seismic energy from one shot is still propagating in the subsurface when the next shot is fired.

In accordance with embodiments of the invention which are described herein, a shot record is created for a given shot by recording seismic data over a contiguous time period that includes the time that immediately precedes the shot, as well as time in which one or more subsequent shots occur. Thus, an extended shot record is created and is not limited by the time interval between shots. For purposes of creating the shot record, the acquired seismic data are processed to separate the signal associated with the shot of interest from other "interfering" shots.

Figure 2:
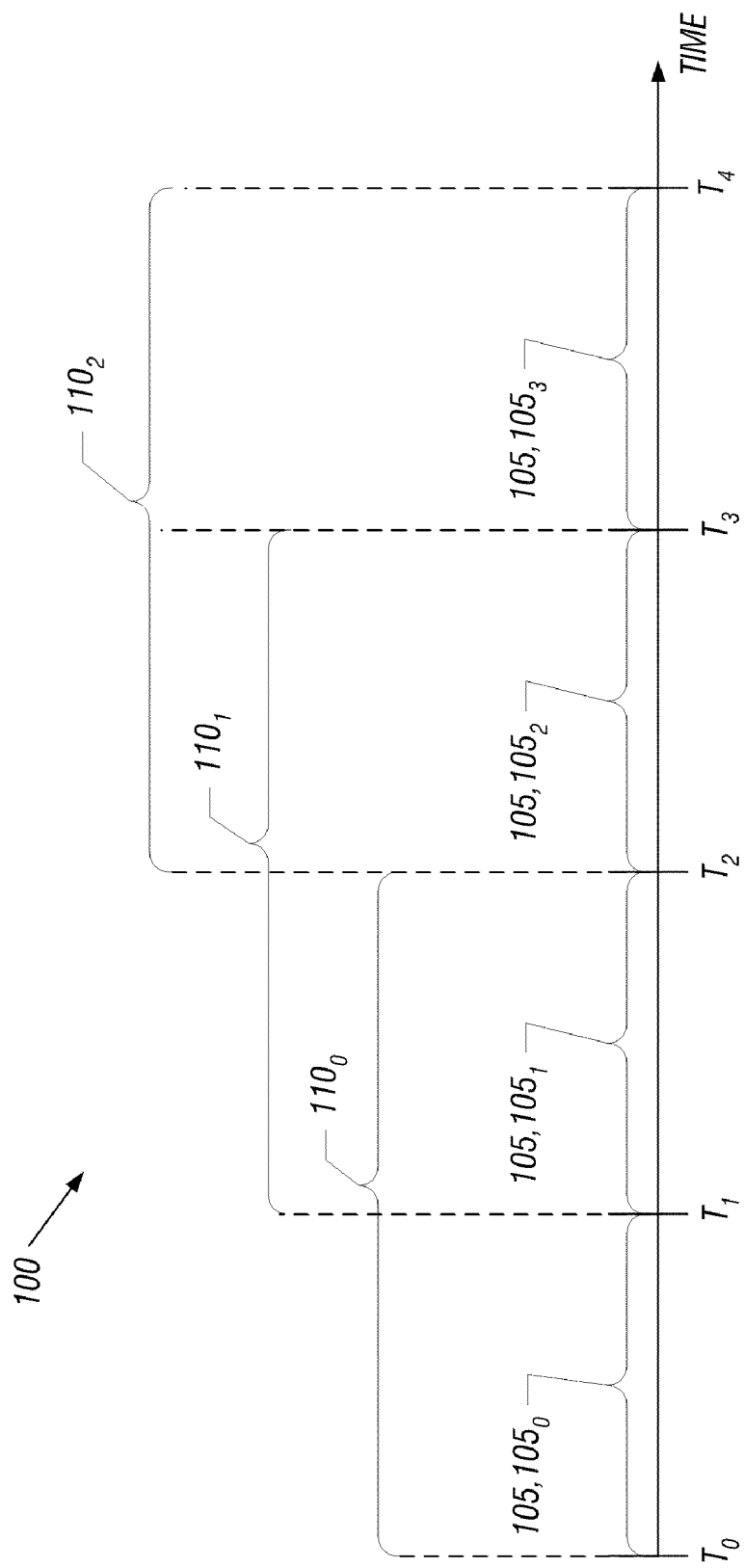
FIG. 2 is an illustration of a timeline of an exemplary sequence of seismic shots according to an embodiment of the invention.

Referring to FIG. 2, as a more specific example, an exemplary sequence 100 of firings, or shots, may occur from time $T_0$ to time $T_4$. More specifically, the shots occur at times $T_0$, $T_1$, $T_2$, $T_3$ and $T_4$, which are separated by shot intervals 105 (shot intervals $105_0$, $105_1$, $105_2$, and $105_3$ being depicted as specific examples in FIG. 2). Conventionally, the shot record for a given shot corresponds to seismic data acquired during a time interval that begins with the given shot and ends before the next shot. Thus, conventionally, a shot record for the shot that occurs at time $T_0$ is created from the seismic data that are acquired during the time interval 105 from time $T_0$ until a time near time $T_1$ when the next shot occurs. Subsequently, another shot record for the shot at time $T_1$ is created via data that are acquired during a time interval $105_1$ that proceeds the time $T_1$. Likewise, conventionally, the time intervals $105_2$ and $105_3$ are used for purposes of recording the seismic energy for shot records that correspond to the shots occurring at times $T_2$ and $T_3$, respectively. A significant challenge with this approach, however, is that the shot record length is limited by the time interval 105.

In accordance with embodiments of the invention described herein, the shot record has a length, or duration, which is longer than the interval 105 between shots. For example, in accordance with some embodiments of the invention, seismic energy from a given shot is recorded over an expanded time interval 110 (exemplary time intervals $110_0$, $110_1$ and $110_2$, being depicted in FIG. 2) that spans two of the time intervals 105. Thus, for this example, the shot record for the shot occurring at time $T_0$ is created based on seismic data that are recorded during a time interval $110_0$ that spans the two time intervals $105_0$ and $105_1$. As another example, the shot record for the shot occurring at time $T_2$ is created based on seismic data that are recorded during the time interval $110_2$ that spans the time intervals $105_2$ and $105_3$.

The advantages of extending the seismic record length beyond the shot interval may include one or more of the following. Seismic data may be acquired faster than conventional acquisition techniques. Long seismic records may be more economically feasible. Physical limitations, such as vessel speed, no longer control the length of the shot record. It is noted that relatively long shot records may be very useful in imaging complex structures (using so-called coda waves), deep imaging, inversion, etc. Other and different advantages are possible in accordance with other embodiments of the invention.

It is noted that in the example above, the shot record lengths spans two time intervals 105. However, it is understood that in accordance with other embodiments of the invention, the shot record may have other lengths, which exceed the shot interval 105. For example, in accordance with other embodiments of the invention, the shot record may be associated with one time interval 105 and a fraction of the next successive time interval 105; more than two time intervals 105; etc. Thus, many variations are contemplated and are within the scope of the appended claims.

Due to the extension of the record length beyond the shot interval, the recorded seismic data contains "noise" from other "interfering" shots. For example, the shot record for the shot occurring at time $T_0$ may be formed from the seismic data that is recorded in an interval $110_0$, which spans the time intervals $105_0$ and $105_1$. However, the seismic data acquired during the interval $105_1$ contains "noise" produced by the shot at time $T_1$. For purposes of removing the interfering shot noise from the trace recorded during the interval $105_1$, one of many different techniques may be applied, such as the one that is described in, for example, U.S. Pat. No. 5,924,049, entitled "METHODS FOR ACQUIRING AND PROCESSING SEISMIC DATA," which issued on Jul. 13, 1999, and is hereby incorporated by reference in its entirety, or the source separation technique that is described in U.S. patent application Ser. No. 11/964,402, entitled "SEPARATING SEISMIC SIGNALS PRODUCED BY INTERFERING SEISMIC SOURCES," which was filed on Dec. 26, 2007, and is hereby incorporated by reference in its entirety. It is noted that for the shot record associated with time $T_0$, the seismic data that are recorded in the time interval $105_0$ may contain noise that is attributable to a shot that occurred prior to time $T_0$.

Figure 3:
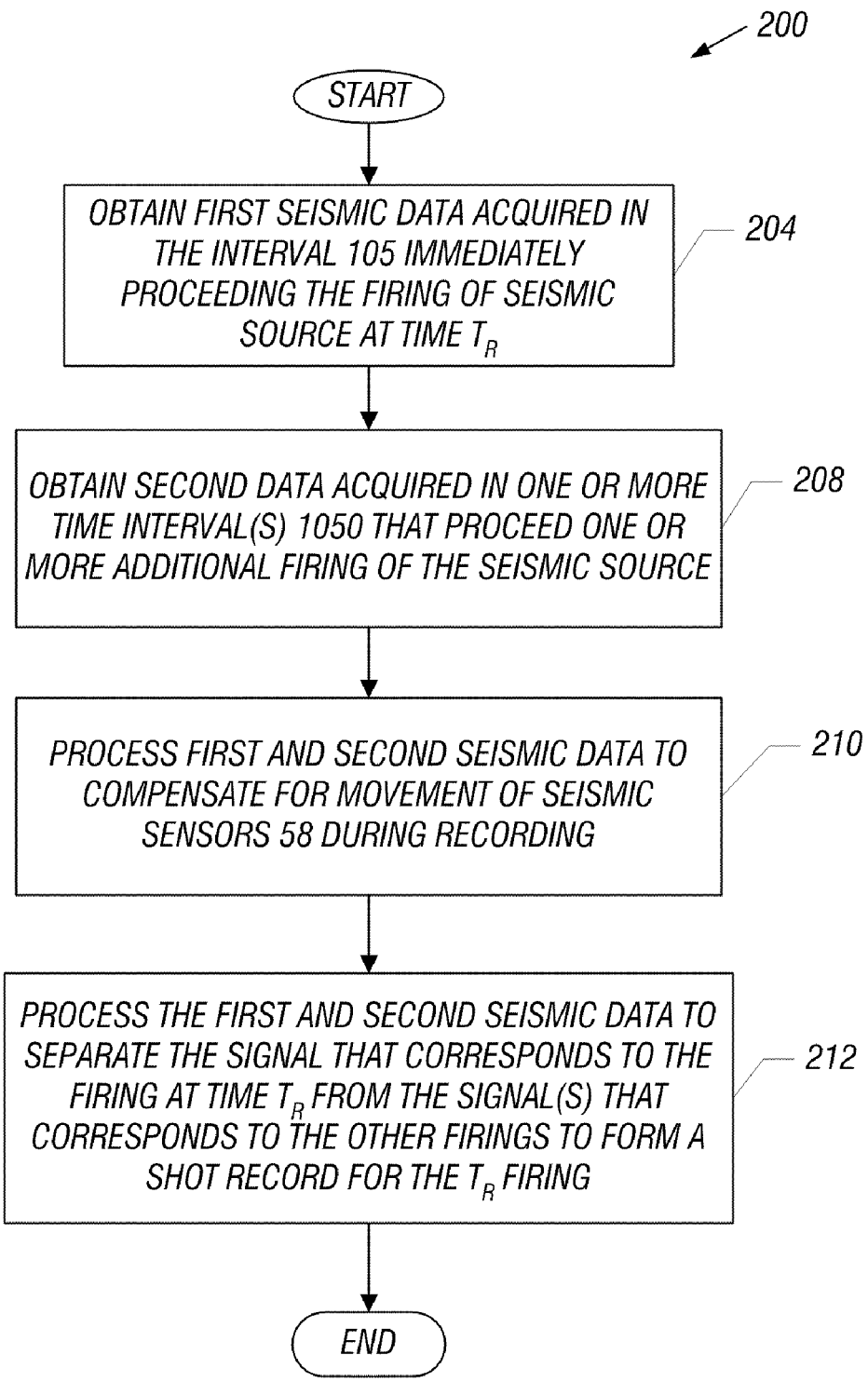
FIG. 3 is a flow diagram depicting a technique to increase the length of a shot record according to an embodiment of the invention.

To summarize, FIG. 3 depicts a technique 200 that may be applied to effectively increase the shot record length for an exemplary shot occurring at a given time (called time "$T_R$," in FIG. 3), in accordance with embodiments of the invention. The technique 200 include obtaining (block 204) first seismic data, which are acquired in a time interval 105 that immediately proceeds the firing of a seismic source at time $T_R$. The technique 200 also includes obtaining (block 208) second seismic data that are acquired in one or more proceeding time intervals 105 in which at least one additional firing of the seismic source occurs. In accordance with some embodiments of the invention, the first and second data are processed (block 210) to compensate for the movement of the seismic sensors 58 during the recording. The first and second seismic data are processed (block 212) to separate the signal that corresponds to the shot at time $T_R$ from the signal(s) that correspond to other shots to form a shot record for the time $T_R$ firing.

Figure 4:
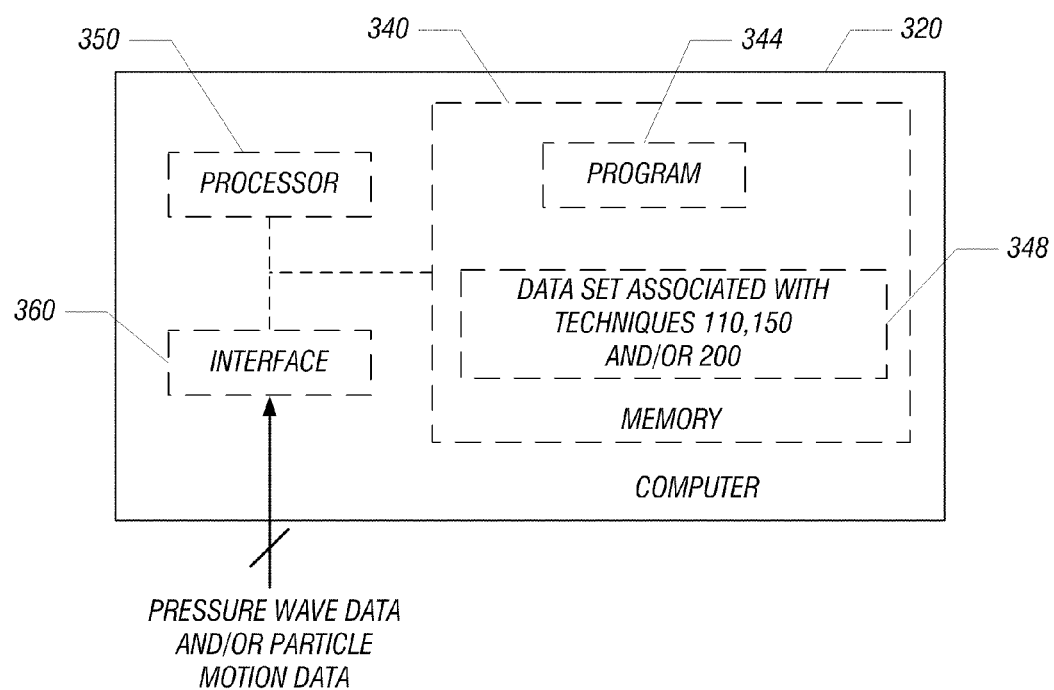
FIG. 4 is a schematic diagram of a seismic data processing system according to an embodiment of the invention.

Referring to FIG. 4, in accordance with some embodiments of the invention, a seismic data processing system 320 may perform at least some of the techniques that are disclosed herein for purposes of increasing the shot record lengths. In accordance with some embodiments of the invention, the system 320 may include a processor 350, such as one or more microprocessors and/or microcontrollers. Depending on the particular embodiment of the invention, the processor 350 may be located on a streamer 30 (FIG. 1), located on the vessel 20 or located at a land-based processing facility (as examples), as examples.

The processor 350 may be coupled to a communication interface 360 for purposes of receiving seismic data that corresponds to pressure and/or particle motion measurements from the seismic sensors 58. Thus, in accordance with embodiments of the invention described herein, the processor 350, when executing instructions stored in a memory of the seismic data processing system 320, may receive multi-component data and/or pressure sensor data that are acquired by seismic sensors while in tow. It is noted that, depending on the particular embodiment of the invention, the data may be data that are directly received from the sensors as the data are being acquired (for the case in which the processor 350 is part of the survey system, such as part of the vessel or streamer) or may be sensor data that were previously acquired by seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various input and/or output datasets involved with processing the seismic data in connection with the technique 200, as indicated by reference numeral 348. The memory 340 may store program instructions 344, which when executed by the processor 350, may cause the processor 350 to perform various tasks of one or more of the techniques that are disclosed herein, such as the technique 200, and display results obtained via the technique(s) on a display (not shown in FIG. 4) of the system 320, in accordance with some embodiments of the invention.

Other embodiments are within the scope of the appended claims. For example, although a towed marine-based seismic acquisition system has been described above, the techniques and systems described herein for increasing the shot record length may likewise be applied to other types of seismic acquisition systems. As non-limiting examples, the techniques and system that are described herein may be applied to seabed, borehole and land-based seismic acquisition systems. Thus, the seismic sensors and sources may be stationary or may be towed, depending on the particular embodiment of the invention. As other examples of other embodiments of the invention, the seismic sensors may be multi-component sensors that acquire measurements of particle motion and pressure, or alternatively the seismic sensors may be hydrophones only, which acquire pressure measurements. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    obtaining first seismic data acquired by seismic sensors during a first time period after a first firing of a seismic source;
    obtaining second seismic data acquired by the seismic sensors during a subsequent time period after a second firing of the seismic source;
    extracting information from the second seismic data pertaining to the first firing; and
    generating a shot record corresponding to the first firing of the seismic source based at least in part on the first seismic data and the information.

2. The method of claim 1, wherein the first firing produces seismic energy sensed by the seismic sensors during the subsequent time period, and the second seismic energy indicates said energy sensed by the seismic sensors during the subsequent time period.

3. The method of claim 1, wherein the second firing comprises the next firing of the seismic source after the first firing, and the subsequent time period spans from a time associated with the second firing to a time associated with the next firing of the seismic source after the second firing.

4. The method of claim 1, wherein the second firing comprises the next firing of the seismic source after the first firing, and the subsequent time period spans from a time associated with the second firing to a time before the next firing of the seismic source after the second firing.

5. The method of claim 1, wherein the second firing comprises the next firing of the seismic source after the first firing, and the subsequent time period spans from a time associated with the second firing to a time after the next firing of the seismic source after the second firing.

6. The method of claim 1, wherein the generating comprises:
    processing the second seismic data to separate a signal associated with the first firing from a signal associated with the second firing to produce processed data.

7. The method of claim 1, further comprising:
    placing limitations on one or more criteria selected from the group consisting of a rate of the towing, a time between the first and second firings and a length of the shot record.

8. The method of claim 1, wherein the shot record comprises data indicative of seismic energy generated by a plurality of firings of the seismic source over a continuous time interval.

9. The method of claim 1, wherein the generating comprises:
    processing the first seismic data to separate a signal associated with a subsequent firing of the seismic source before the first firing from a signal associated with the first firing to produce processed data.

10. The method of claim 1, wherein at least one additional seismic source is fired near the first firing of the seismic source before the second firing of the seismic source, and the first and second seismic data indicates seismic energy attributable to said at least one additional seismic source.

11. The method of claim 10, wherein the shot record also corresponds to said at least one additional seismic source.

12. The method of claim 1, further comprising:
    processing the shot record, including performing noise attenuation, deghosting or migration.

13. The method of claim 1, further comprising:
    processing the first and second seismic data to compensate for movement of the seismic sensors during the acquisition of the first and second seismic data.

14. A method comprising:
    obtaining first seismic data acquired by seismic sensors during a first time period after a first firing of a seismic source;
    obtaining second seismic data acquired by the seismic sensors during a subsequent time period after a second firing of the seismic source; and
    generating a shot record corresponding to the first firing of the seismic source based on the first and second seismic data, the generating comprising combining the first seismic data with information extracted from the second seismic data corresponding to the first firing.

15. The method of claim 14, wherein at least one additional seismic source is fired near the first firing of the seismic source before the second firing of the seismic source, and the first and second seismic data indicates seismic energy attributable to the at least one additional seismic source.

16. The method of claim 14, further comprising:
    processing the first and second seismic data to compensate for movement of the seismic sensors during the acquisition of the first and second seismic data.

17. The method of claim 14, further comprising:
    placing limitations on one or more criteria selected from the group consisting of a rate of the towing, a time between the first and second firings and a length of the shot record.

18. The method of claim 14, wherein the shot record comprises data indicative of seismic energy generated by a plurality of firings of the seismic source over a continuous time interval.

* * * * *